United States Patent
Tongue et al.

(10) Patent No.: US 10,301,034 B2
(45) Date of Patent: May 28, 2019

(54) FUEL TANK ULLAGE PURGE SYSTEM

(71) Applicant: Hamilton Sundstrand Corporation, Windsor Locks, CT (US)

(72) Inventors: Stephen E. Tongue, Hampden, MA (US); Jonathan Rheaume, West Hartford, CT (US); Haralambos Cordatos, Colchester, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 99 days.

(21) Appl. No.: 15/299,811

(22) Filed: Oct. 21, 2016

(65) Prior Publication Data

US 2018/0111696 A1 Apr. 26, 2018

(51) Int. Cl.
*B01D 53/02* (2006.01)
*B64D 37/32* (2006.01)
*B64D 37/02* (2006.01)
*F02C 9/18* (2006.01)

(52) U.S. Cl.
CPC ............ *B64D 37/32* (2013.01); *B64D 37/02* (2013.01); *F02C 9/18* (2013.01)

(58) Field of Classification Search
CPC ............ B64D 37/32; B64D 37/02; F02C 9/18
See application file for complete search history.

(56) References Cited

U.S. PATENT DOCUMENTS

| | | | |
|---|---|---|---|
| 2,860,815 A | 11/1958 | Finn et al. | |
| 2,944,987 A | 7/1960 | Potter et al. | |
| 3,672,180 A | 6/1972 | Davis | |
| 3,847,298 A | 11/1974 | Hamilton | |
| 4,194,924 A | 3/1980 | Burnett et al. | |
| 6,343,465 B1 | 2/2002 | Martinov | |
| 8,499,567 B2 | 8/2013 | Hagh et al. | |
| 8,808,428 B2 | 8/2014 | Gupta | |
| 9,011,218 B2 | 4/2015 | Kastell et al. | |
| 9,114,886 B2 | 8/2015 | Gupta | |

(Continued)

FOREIGN PATENT DOCUMENTS

| | | |
|---|---|---|
| CA | 2801180 A1 | 9/2013 |
| GB | 1039361 A | 8/1966 |

(Continued)

OTHER PUBLICATIONS

Federal Aviation Administration, Office of Aviation Research, "A Review of the Flammability Hazard of Jet A Fuel Vapor in Civil Transport Aircraft Fuel Tanks", DOT/FAA/AR-98/26 (1998); 62 pages.

(Continued)

*Primary Examiner* — Christopher P Jones
(74) *Attorney, Agent, or Firm* — Cantor Colburn LLP

(57) ABSTRACT

A purge system includes an airflow source to provide an airflow, and a fuel tank, including: a tank volume including a tank ullage, at least one inlet, wherein the at least one inlet is in fluid communication with the tank ullage and the airflow source to provide the airflow as an inbound airflow to the tank ullage, and at least one outlet, wherein the at least one outlet is in fluid communication with the tank ullage and an overboard location outside the aircraft to direct the inbound airflow as an outbound airflow from the tank ullage to the overboard location.

18 Claims, 4 Drawing Sheets

(56) References Cited

U.S. PATENT DOCUMENTS

| | | |
|---|---|---|
| 2008/0264951 A1 | 10/2008 | Tweet et al. |
| 2012/0035406 A1 | 2/2012 | Lam et al. |
| 2014/0161698 A1 | 6/2014 | Klimpel |
| 2014/0208943 A1* | 7/2014 | Gupta ............... B64D 37/32 95/14 |
| 2014/0238501 A1* | 8/2014 | Tichborne ............ B64D 37/32 137/12 |
| 2014/0352314 A1 | 12/2014 | Belleville |
| 2015/0040986 A1* | 2/2015 | Tichborne ............... A62C 3/08 137/1 |
| 2015/0217153 A1* | 8/2015 | Jones .................... A62C 3/08 169/62 |
| 2016/0186671 A1 | 6/2016 | Austin et al. |

FOREIGN PATENT DOCUMENTS

| | | |
|---|---|---|
| GB | 2477576 A | 8/2011 |
| RU | 2487059 C1 | 7/2013 |

OTHER PUBLICATIONS

Search Report dated Feb. 26, 2018 in U310842EP, EP application No. 17197441, 7 pages.

* cited by examiner

FUEL TANK ULLAGE PURGE SYSTEM

BACKGROUND

The subject matter disclosed herein relates to passivation systems, and more particularly, to passivation systems for use with aircraft fuel systems.

Fuel systems utilized within an aircraft may employ inerting systems to reduce the flammability of fuel vapors within the tank ullage of the fuel tank. Inerting systems within fuel systems may be utilized to provide a nitrogen-enriched environment, an oxygen-depleted environment, etc., to prevent ignition of fuel vapors. Inerting systems add additional weight, complexity, and expense.

BRIEF SUMMARY

According to an embodiment, a purge system includes an airflow source to provide an airflow, and a fuel tank, including: a tank volume including a tank ullage, at least one inlet, wherein the at least one inlet is in fluid communication with the tank ullage and the airflow source to provide the airflow as an inbound airflow to the tank ullage, and at least one outlet, wherein the at least one outlet is in fluid communication with the tank ullage and an overboard location outside the aircraft to direct the inbound airflow as an outbound airflow from the tank ullage to the overboard location.

According to an embodiment, a method to purge hydrocarbon vapors includes providing a cool airflow via an airflow source, providing a fuel tank having a tank volume with a tank ullage, providing the cool airflow as an inbound airflow to the tank ullage via at least one purge duct of the fuel tank, and directing the inbound airflow as an outbound airflow from the tank ullage to an overboard location via a vent of the fuel tank.

According to an embodiment, an aircraft includes an airflow source to provide an airflow, an aircraft body, and a fuel tank disposed within the aircraft body, the fuel tank including: a tank volume including a tank ullage, at least one inlet, wherein the at least one inlet is in fluid communication with the tank ullage and the airflow source to provide the airflow to the tank ullage, and at least one outlet, wherein the at least one outlet is in fluid communication with the tank ullage and an overboard location outside the aircraft to direct the airflow from the tank ullage to the overboard location.

Technical function of the embodiments described above includes at least one inlet, wherein the at least one inlet is in fluid communication with the tank ullage and the airflow source to provide the airflow as an inbound airflow to the tank ullage, at least one outlet, wherein the at least one outlet is in fluid communication with the tank ullage and an overboard location outside the aircraft to direct the inbound airflow as an outbound airflow from the tank ullage to the overboard location. Other aspects, features, and techniques of the embodiments will become more apparent from the following description taken in conjunction with the drawings.

BRIEF DESCRIPTION OF THE DRAWINGS

The subject matter is particularly pointed out and distinctly claimed in the claims at the conclusion of the specification. The foregoing and other features, and advantages of the embodiments are apparent from the following detailed description taken in conjunction with the accompanying drawings in which like elements are numbered alike in the FIGURES:

DETAILED DESCRIPTION

Figure 1A:
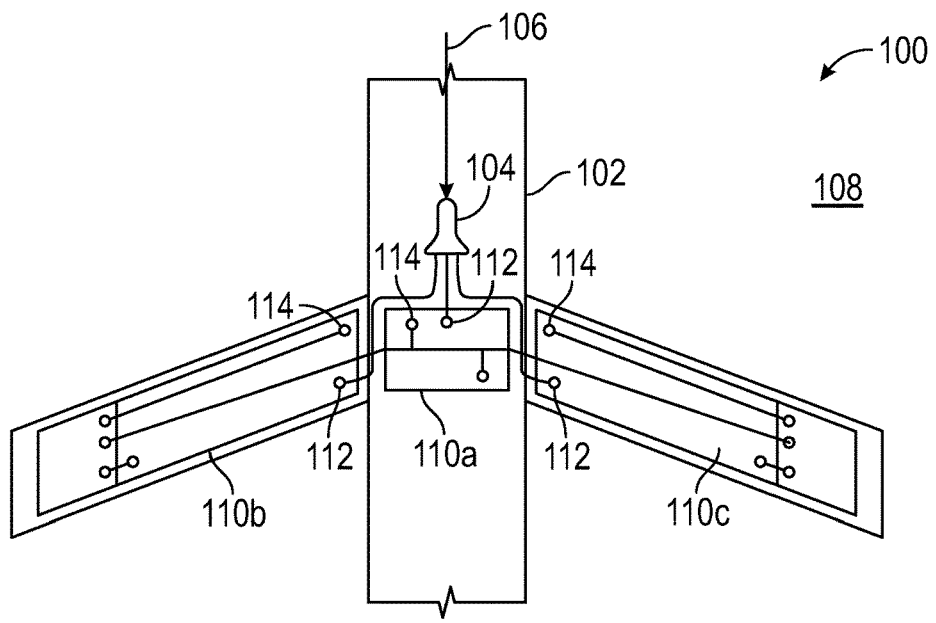
FIG. 1A is a schematic view of an aircraft with one embodiment of a purge system.

Referring to the drawings, FIG. 1A shows an aircraft 100. In the illustrated embodiment, the aircraft 100 include an aircraft body 102, an airflow source 104, and fuel tanks 110a-110c. In the illustrated embodiment, the fuel tanks 110a-110c utilize the airflow source 104 to transfer fuel vapors from within the fuel tanks 110a-110c to an overboard location 108. Advantageously, by removing fuel vapors from within the fuel tanks 110a-110c potential ignition of fuel vapors is reduced without the use of complex or heavy inerting systems. In some embodiments, the above-referenced fuel tank system can be utilized on-board any suitable vehicle. The term "vehicle" includes any powered conveyance device, including but not limited to aircraft, marine vessels, railroad engines, or roadway motor vehicles. In some embodiments, the vehicle is an aircraft. In some embodiments, the vehicle is a marine vessel such as a marine vessel fueled by liquefied natural gas (LNG). In some embodiments, the above-referenced fuel tank system can be used for stationary applications, including but not limited to fuel depots, fuel storage, etc.

In the illustrated embodiment, the airflow source 104 can provide an airflow to one or more of the fuel tanks 110a-110c. In the illustrated embodiment, the airflow source 104 is a duct that can receive ram air 106 during flight of the aircraft. The duct can be a NACA scoop to reduce drag during operation. Ram air 106 is airflow that is received by the aircraft due to movement of the aircraft 100. In other embodiments, the airflow source 104 can be other suitable source as described herein. In certain embodiments, the airflow source 104 can be an ambient airflow source, including, but not limited to ambient airflow from outside the aircraft (ram air), etc. In certain embodiments, ambient airflow can be directed within the aircraft body by a NACA scoop, etc. In certain embodiments, the airflow source 104 can be a ram air duct (as shown in FIG. 1A) to utilize external airflow from outside the aircraft. In certain embodiments, the airflow source 104 can be a cabin airflow source to utilize airflow from within a passenger cabin of the aircraft. In certain embodiments, the airflow source 104 can be a cargo hold airflow source. In certain embodiments, the airflow source 104 can be a flight deck airflow source. Airflow sources from a cabin, cargo hold, and flight deck can be collectively referred to as fuselage sources. In certain embodiments, the airflow source 104 can be fan bleed air from an engine of the aircraft. In certain embodiments, the airflow source 104 is conditioned air from an environmental control system of the aircraft. In certain embodiments, the airflow source 104 can be a combination or hybrid of the airflow sources described herein. In certain embodiments, airflow sources can be selectively provided and combined to provide a desired airflow. In certain embodiments, the airflow source 104 can be augmented with a fan or other positive pressure device to provide airflow when sufficient airflow is not provided (ground operation).

In the illustrated embodiment, the aircraft body 102 can include multiple fuel tanks 110a-110c disposed throughout the aircraft body 102 to store fuel. In the illustrated embodiment, the aircraft 100 can include at least one of a center tank 110a, and wing tanks 110b, 110c. During operation, liquid fuel levels in the fuel tanks 110a-110c is depleted forming a tank ullage that may contain fuel vapors and other hydrocarbons, as shown in FIGS. 2A-2C.

In the illustrated embodiment, each of the fuel tanks 110a-110c includes at least one inlet 112 and at least one outlet 114. In the illustrated embodiment, inlets 112 can introduce airflow from the airflow source 104 into the tank ullage of a fuel tank 110a-110c. Introduced airflow along with fuel vapors and other hydrocarbons can be removed from the tank ullage of the fuel tank 110a-110c via outlets 114. In the illustrated embodiment, the outlets 114 are in fluid communication with the overboard air 108 to direct airflow and fuel vapors to the overboard location 108. In the illustrated embodiment, inlets 112 from multiple fuel tanks 110a-110c can be in fluid communication to share common lines. Similarly, in the illustrated embodiment, outlets 114 from multiple fuel tanks 110a-110c can be in fluid communication to share common lines.

Figure 1B:
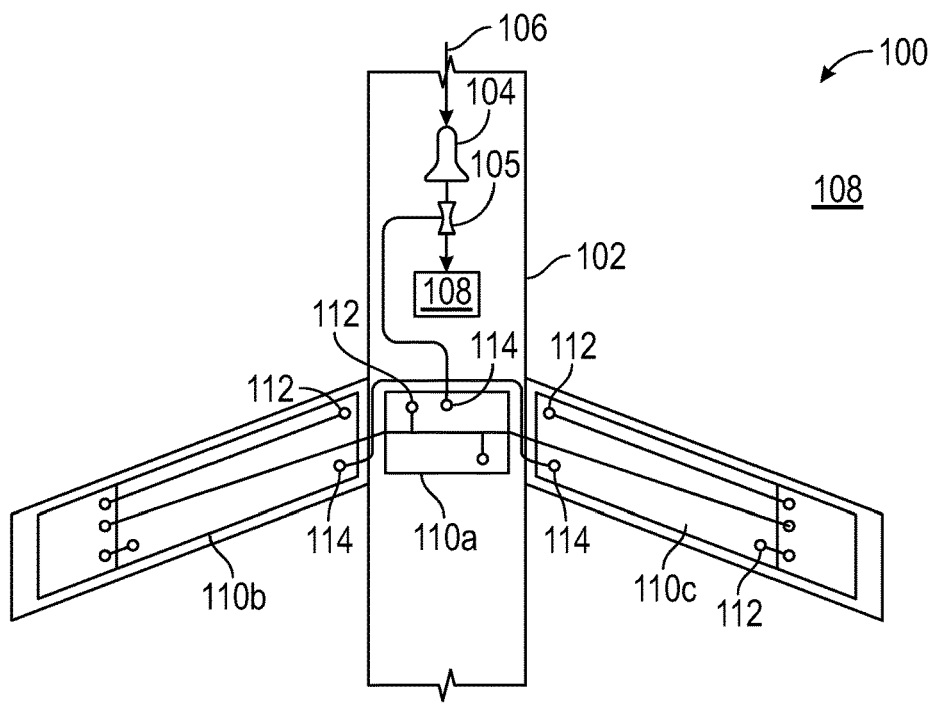
FIG. 1B is a schematic view of an aircraft with another embodiment of a purge system.

Referring to FIG. 1B, another embodiment of the aircraft 100 is shown. In the illustrated embodiment, the aircraft 100 includes an ejector 105. The ejector 105 passes the ram air 106 that enters the airflow source 104 and is accelerated in a construction thereby producing a low pressure region to create suction. In the illustrated embodiment, the suction is applied to the outlets 114 of the fuel tanks 110a-110c. In the illustrated embodiment, airflow is drawn through the inlets 112, through the tank ullage of the fuel tanks 110a-110c and out the outlets 114 to an overboard location via the suction provided by the ejector 105.

Figure 2A:
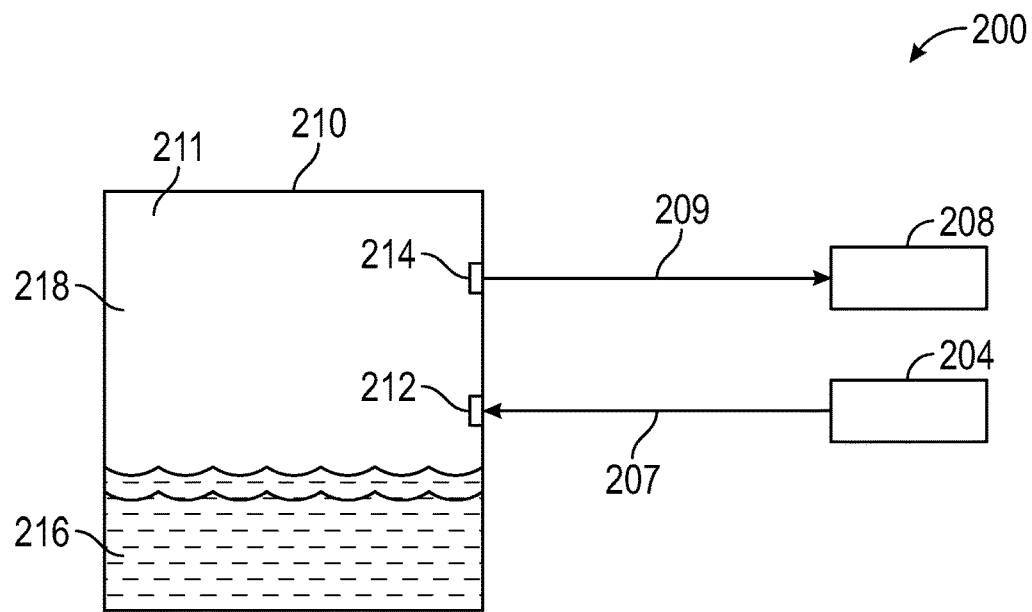
FIG. 2A is a schematic view of an embodiment of a purge system suitable for use with the aircraft of FIGS. 1A and 1B.
Figure 2B:
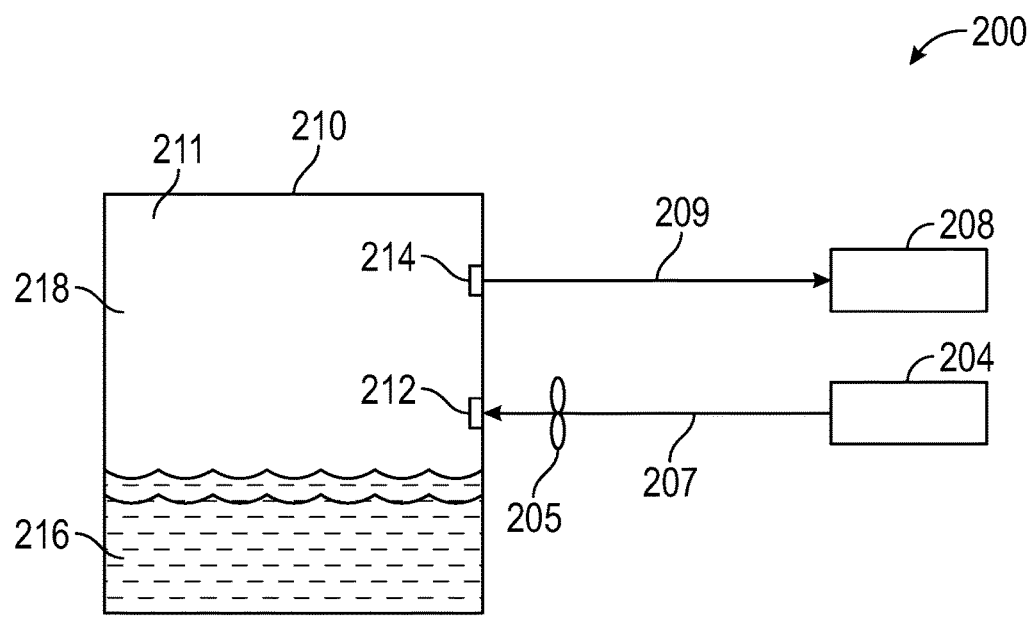
FIG. 2B is a schematic view of an embodiment of a purge system suitable for use with the aircraft of FIGS. 1A and 1B.
Figure 2C:
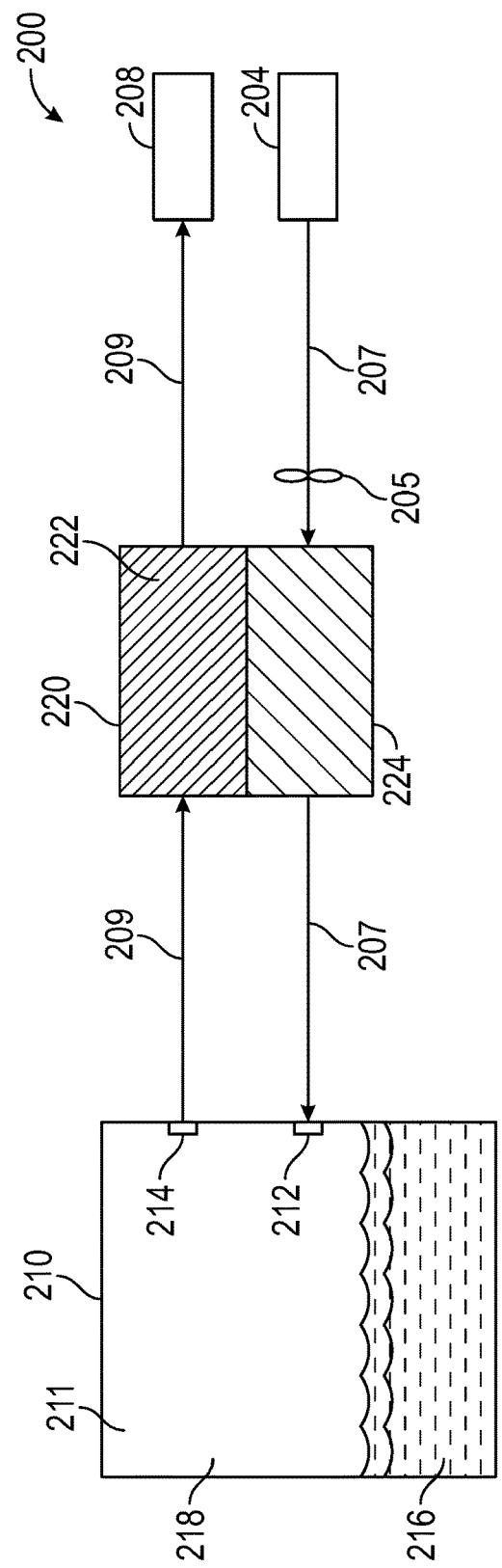
FIG. 2C is a schematic view of an embodiment of a purge system suitable for use with the aircraft of FIGS. 1A and 1B.

Referring to FIG. 2A, a fuel tank 210 of a purge system 200 suitable for use with the aircraft 100 is shown. The purge system 200 can further be referred to as a fuel tank safety system. In the illustrated embodiment, the purge system 200 includes a fuel tank 210 and an airflow source 204. In the illustrated embodiment, the purge system 200 can introduce airflow within the fuel tank 210. Advantageously, the purge system 200 can reduce fuel vapor temperatures and the presence of fuel vapors within the fuel tank 210 to reduce potential ignition of fuel vapors and other hydrocarbons.

In the illustrated embodiment, the fuel tank 210 includes a tank volume 211, at least one inlet 212 and at least one outlet 214. The fuel tank 210 can contain liquid fuel 216. In the illustrated embodiment, the remaining volume within the tank volume 211 is the tank ullage 218. The tank ullage 218 can contain fuel vapors and other hydrocarbons. The tank ullage 218 can comprise various chemical compounds, including but not limited to components of air (e.g., nitrogen, oxygen) such as residual air from a tank filling process or outlet air that entered the tank to fill space previously occupied by liquid fuel as the fuel is consumed, water vapor, hydrocarbon vapor resulting from evaporation of liquid fuel. Advantageously, use of the purge system 200 can reduce fuel vapor concentration within the tank ullage 218 below the lower explosive limit by removing fuel vapor and other hydrocarbons that could be ignited.

Further, the purge system 200 can reduce the temperature of the tank ullage 218. Advantageously, the amount of fuel vapor within the tank ullage 218 is dependent on the temperature within the tank ullage 218. Therefore, below a threshold temperature, ignition of vapor within the tank ullage 218 will not occur. The threshold temperature can range from approximately 95 degrees F. at sea level to approximately 55 degrees F. at 40,000 feet.

In the illustrated embodiment, airflow can be introduced into the tank ullage 218 via the inlets 212. Advantageously, the airflow can dilute and remove the fuel vapors within the tank ullage 218 while also reducing tank ullage 218 temperatures. In the illustrated embodiment, the inlets 212 are in fluid communication with an airflow source 204. An inboard airflow 207 from the airflow source 204 to the inlets 212 is directed to the tank ullage 218. In certain embodiments, the inboard airflow 207 can be directed via a duct.

In the illustrated embodiment, the airflow source 204 can provide airflow to the tank ullage 218 via the inlets 212. The airflow source 204 provides low to no hydrocarbons to maintain the tank ullage 218 below flammability limits. In various embodiments, the airflow source 204 can be any suitable source of low to no hydrocarbon airflow. In certain embodiments, the airflow source 204 can be an ambient airflow source, including, but not limited to ambient airflow from outside the aircraft (ram air), etc. In certain embodiments, ambient airflow can be directed within the aircraft body by a NACA scoop, etc. In certain embodiments, the airflow source 204 can be a ram air duct (as shown in FIG. 1A as airflow source 104) to utilize external airflow from outside the aircraft. In certain embodiments, the airflow source 204 can be a cabin airflow source to utilize airflow from within a passenger cabin of the aircraft. In certain embodiments, the airflow source 204 can be a cargo hold airflow source. In certain embodiments, the airflow source 204 can be a flight deck airflow source. In certain embodiments, the airflow source 204 can be fan bleed air from an engine of the aircraft. In certain embodiments, the airflow source 204 is conditioned air from an environmental control system of the aircraft. In certain embodiments, the airflow source 204 can be a combination or hybrid of the airflow sources described herein. In certain embodiments, airflow sources can be selectively provided and combined to provide a desired airflow.

In the illustrated embodiment, outlets 214 can direct airflow from the tank ullage 218 to an overboard location 208 via an outboard airflow 209. In the illustrated embodiment, airflow from the inlets 212 can dilute and mix with fuel vapors that are removed from the tank ullage 218 via the outlets 214. In certain embodiments, outboard airflow 209 can be directed to a catalyst with a flame arrestor wherein the outboard airflow 209 is burned to prevent hydrocarbon emissions. Any hydrocarbon vapors exiting the tank can be recaptured in any suitable manner. Advantageously, the purge system 200 can keep the fuel ullage 218 below the lower explosive limits without the use of more complex methods that require additional components.

Referring to FIG. 2B, another embodiment of the purge system 200 is shown. In the illustrated embodiment, a fan 205 is in fluid communication with the inbound airflow 207. The fan 205 can provide positive pressure to the inbound airflow 207 to direct airflow into the tank ullage 218. Advantageously, the fan 205 can allow for airflow from airflow sources 204 that may require external airflow, and can provide airflow when an aircraft is on the ground, or slowly moving, etc.

Referring to FIG. 2C, another embodiment of the purge system 200 is shown. In the illustrated embodiment, a regenerative heat exchanger 220 is in fluid communication with the inbound airflow 207. The regenerative heat exchanger 220 includes a purge flow side 224 and an overboard flow side 222.

In the illustrated embodiment, inbound air flow 207 can pass through the purge flow side 224 of the regenerative heat exchanger 220. In certain embodiments, the regenerative heat exchanger 220 can precondition the inbound air flow 207 to cool the air to lower the temperature within the tank ullage 218 to below lower explosive limits of the fuel vapor. In certain embodiments, the regenerative heat exchanger 220 can heat the inbound air flow 207 in order to raise the temperature of the fuel 216 to prevent icing or gelling.

In certain embodiments, the regenerative heat exchanger 220 is in fluid communication with the outbound airflow 209 via the overboard flow side 222. In certain embodiments, heat can be transferred between the outbound flow 209 and the inbound flow 207 as needed.

Figure 2D:
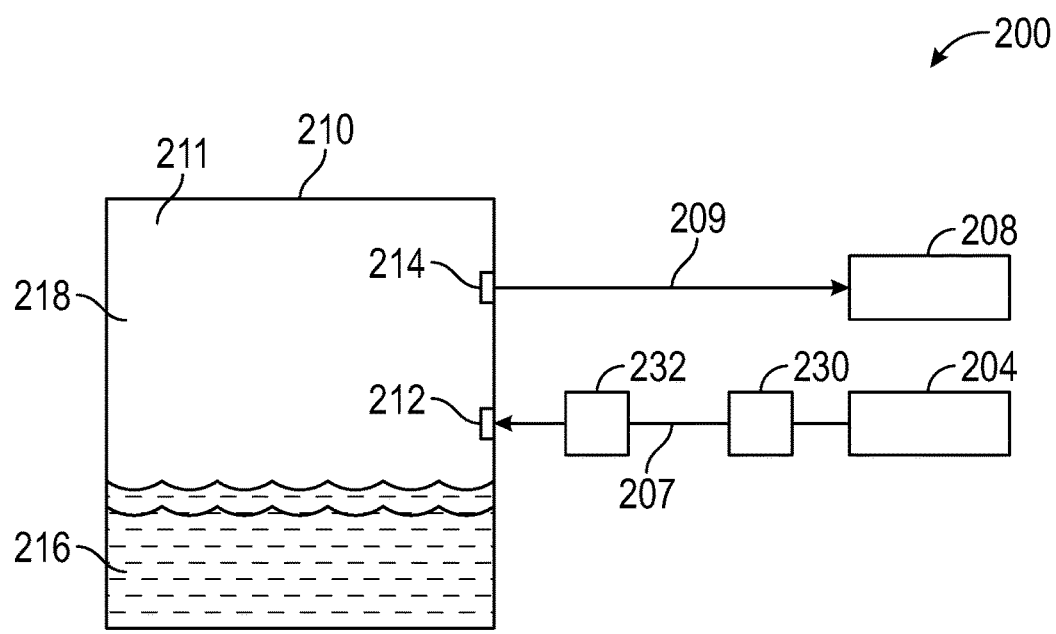
FIG. 2D is a schematic view of an embodiment of a purge system suitable for use with the aircraft of FIGS. 1A and 1B.

Referring to FIG. 2D, another embodiment of the purge system 200 is shown. In the illustrated embodiment, a conditioning device 230 is in fluid communication with the inbound airflow 207. The conditioning device 230 can be an environmental control system, a vapor cycle machine, an air cycle machine, or any other suitable cooling or conditioning device. The conditioning device 230 can provide cooling to the inbound airflow 207 by introducing cool air or by cooling the inbound airflow. Advantageously, cooled airflow can allow ullage gases to remain below the lower flammability limit.

In certain embodiments, a drying device 232 is in fluid communication with the inbound airflow 207. The drying device 232 can be a drier or any other suitable device. The drying device 232 can further remove humidity from the inbound airflow 207. In certain embodiments, inbound airflow 207 can selectively bypass or partially bypass at least one of the conditioning device 230 and the drying device 232 to provide a desired airflow. Advantageously, dried airflow can discourage bacterial growth and icing within the fuel tank 210.

The terminology used herein is for the purpose of describing particular embodiments only and is not intended to be limiting of the embodiments. While the description of the present embodiments has been presented for purposes of illustration and description, it is not intended to be exhaustive or limited to the embodiments in the form disclosed. Many modifications, variations, alterations, substitutions or equivalent arrangement not hereto described will be apparent to those of ordinary skill in the art without departing from the scope and spirit of the embodiments. Additionally, while various embodiments have been described, it is to be understood that aspects may include only some of the described embodiments. Accordingly, the embodiments are not to be seen as limited by the foregoing description, but are only limited by the scope of the appended claims.

What is claimed is:

1. A purge system, comprising:
   an airflow source to provide an airflow; and
   a fuel tank, including:
   a tank volume including a tank ullage;
   at least one inlet, wherein the at least one inlet is in fluid communication with the tank ullage and the airflow source to provide the airflow as an inbound airflow to the tank ullage;
   at least one outlet, wherein the at least one outlet is in fluid communication with the tank ullage and an overboard location to direct the inbound airflow as an outbound airflow from the tank ullage to the overboard location; and
   a heat exchanger in fluid communication with the inbound and the outbound airflows whereby the inbound airflow upstream from the tank ullage thermally communicates with the outbound airflow downstream from the tank ullage to maintain the inbound airflow below lower explosive fuel temperature limits and above fuel gelling temperatures.

2. The purge system of claim 1, wherein the airflow source is an ambient air source.

3. The purge system of claim 1, wherein the airflow source is a fuselage source.

4. The purge system of claim 1, wherein the airflow source is an aircraft fan bleed air source.

5. The purge system of claim 1, further comprising a conditioning device in fluid communication with the inbound airflow.

6. The purge system of claim 1, further comprising a drying device in fluid communication with the inbound airflow.

7. The purge system of claim 1, further comprising a fan in fluid communication with the airflow.

8. The purge system of claim 1, further comprising a suction device in fluid communication with the outbound airflow to provide negative pressure to the outbound airflow.

9. The purge system of claim 8, wherein the suction device is an ejector.

10. A method to purge hydrocarbon vapors, the method comprising:
    providing a cool airflow via an airflow source;
    providing a fuel tank having a tank volume with a tank ullage;
    providing the cool airflow as an inbound airflow to the tank ullage via at least one purge duct of the fuel tank; and
    directing the inbound airflow as an outbound airflow from the tank ullage to an overboard location via a vent of the fuel tank
    providing thermal communication between the inbound and outbound airflows upstream from the at least one purge duct to maintain the inbound airflow below lower explosive fuel temperature limits and above fuel gelling temperatures.

11. The method of claim 10, wherein the cool airflow is cooled via a conditioning device.

12. The method of claim 10, wherein the cool airflow is further dried via a drying device.

13. The method of claim 10, wherein the airflow source is an ambient air source.

14. The method of claim 10, wherein the airflow source is a fuselage air source.

15. The method of claim 10, wherein the airflow source is an aircraft fan bleed air source.

16. The method of claim 10, further comprising a fan in fluid communication with the airflow.

17. An aircraft, comprising:
    an airflow source to provide an airflow;
    an aircraft body comprising a fuselage and wings extending outwardly from the fuselage in opposite directions; and
    a center fuel tank disposed within the fuselage and wing tanks disposed within the wings, the center fuel tank including a center tank volume including a center fuel tank ullage, a leading edge and at least one inlet and at least one outlet proximate to the leading edge, each of the wing tanks respectively including a wing tank volume including a wing tank ullage, an inboard edge and at least one inlet and at least one outlet proximate to the inboard edge;

wherein each of the at least one inlets is in fluid communication with the tank ullage and the airflow source to provide the airflow to the corresponding tank ullage;

wherein each of the at least one outlets is in fluid communication with the corresponding tank ullage and an overboard location outside the aircraft to direct the airflow from the corresponding tank ullage to the overboard location; and wherein the aircraft further comprises a heat exchanger disposed upstream from the at least one inlets and downstream from the at least one outlets, wherein airflow being provided to the center and the wing tank ullages thermally communicates with the airflow being directed to the overboard location to maintain the airflow being provided to the center and the wing tank ullages below lower explosive fuel temperature limits and above fuel gelling temperatures.

18. The aircraft according to claim 17, further comprising:

common lines by which each of the at least one inlets are fluidly communicative with each other and the airflow source, and common lines by which each of the at least one outlets are fluidly communicative with each other and the overboard location.

* * * * *